US008583774B2

(12) United States Patent
Wood et al.

(10) Patent No.: US 8,583,774 B2
(45) Date of Patent: Nov. 12, 2013

(54) MAPPING MEANINGFUL HOSTNAMES

(75) Inventors: Kevin Wood, Seattle, WA (US); Salim Alam, Mercer Island, WA (US); Xing Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 13/193,625

(22) Filed: Jul. 29, 2011

(65) Prior Publication Data
US 2012/0278461 A1 Nov. 1, 2012

Related U.S. Application Data

(60) Provisional application No. 61/479,923, filed on Apr. 28, 2011.

(51) Int. Cl.
G06F 15/173 (2006.01)
(52) U.S. Cl.
USPC ............................ 709/223; 709/203; 709/217
(58) Field of Classification Search
USPC ........................................ 709/203, 217, 223
See application file for complete search history.

(56) References Cited

U.S. PATENT DOCUMENTS

| 6,968,390 | B1 * | 11/2005 | Chavez, Jr. ................... 709/238 |
| 7,548,945 | B2 | 6/2009 | Asnis |
| 2002/0138634 | A1 * | 9/2002 | Davis et al. ................... 709/229 |
| 2003/0051010 | A1 * | 3/2003 | French et al. ................. 709/220 |
| 2008/0016311 | A1 * | 1/2008 | Harada ......................... 711/170 |
| 2009/0144419 | A1 * | 6/2009 | Riordan et al. ............... 709/224 |
| 2010/0023621 | A1 | 1/2010 | Ezolt et al. |
| 2010/0030914 | A1 * | 2/2010 | Sparks et al. ................. 709/235 |
| 2010/0124220 | A1 | 5/2010 | Morris |
| 2010/0199042 | A1 * | 8/2010 | Bates et al. ................... 711/114 |

OTHER PUBLICATIONS

"Using a host name mapping file", Retrieved at <<http://publib.boulder.ibm.com/infocenter/clresctr/vxrx/index.jsp?topic=%2Fcom.ibm.cluster.csm16.install.doc%2Fam7il__uhmnmfi.html>>, Retrieved date:May 6, 2011, p. 1.
Barrera, III, Joseph S., "Using IP Address Mobility", Retrieved at <<http://www.barrera.org/ipmobility/ipmobility.htm>>,Retrieved date:May 6, 2011, pp. 3.
"The Hosts File and what it can do for you", Retrieved at <<http://www.bleepingcomputer.com/tutorials/tutorial51.html>>, Apr. 9, 2004,pp. 3.
"Understanding Host Name Resolution", Retrieved at <<http://www.tech-faq.com/understanding-host-name-resolution.html>>, Retrieved date:May 6, 2011, pp. 9.
"What is the Hosts file?", Retrieved at <<http://aces-net.com/hosts/what__is__hosts.html>>,Retrieved date:May 6, 2011, pp. 2.
Davies, Joe, "Host Name Resolution", Retrieved at <<http://technet.microsoft.com/en-us/library/bb727005.aspx>>, Apr. 21, 2005, pp. 9.

* cited by examiner

Primary Examiner — Phuoc Nguyen
(74) Attorney, Agent, or Firm — Michael B Dodd; Dodd Law Group

(57) ABSTRACT

A set of interacting devices within a cluster environment may use a secondary naming system to assign and transfer friendly names between devices within the cluster. The cluster may be operated inside, outside, or partially within a cloud computing environment. The secondary naming system may maintain a hosts file within the addressable memory of each member of the cluster, where the hosts file may updated and changes propagated to every member of the cluster so that each member maintains an identical hosts file.

20 Claims, 4 Drawing Sheets

MAPPING MEANINGFUL HOSTNAMES

CROSS REFERENCE TO RELATED APPLICATIONS

This application claims the benefit of and priority to U.S. Provisional Patent Application Ser. No. 61/479,923, filed 28 Apr. 2011 by Kevin Wood entitled "Mapping Meaningful Hostnames".

BACKGROUND

Many network environments allow a device to be addressed using two forms: a network address and a friendly name. In many networks, a Domain Name Service (DNS) may respond to a request containing the friendly name with the corresponding network address. In many cases, the friendly name may relate to a service or device that may be transferred from one hardware platform to another but may continue to provide the service. In such cases, the network address for the service may change from one device to another even though the friendly name may remain the same.

In some cloud computing environments, virtualized devices may be assigned friendly names as well as network addresses. In some applications, various virtualized devices may communicate directly with each other and may attempt to address each other using friendly names.

SUMMARY

A set of interacting devices within a cluster environment may use a secondary naming system to assign and transfer friendly names between devices within the cluster. The cluster may be operated inside, outside, or partially within a cloud computing environment. The secondary naming system may maintain a hosts file within the addressable memory of each member of the cluster, where the hosts file may updated and changes propagated to every member of the cluster so that each member maintains an identical hosts file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
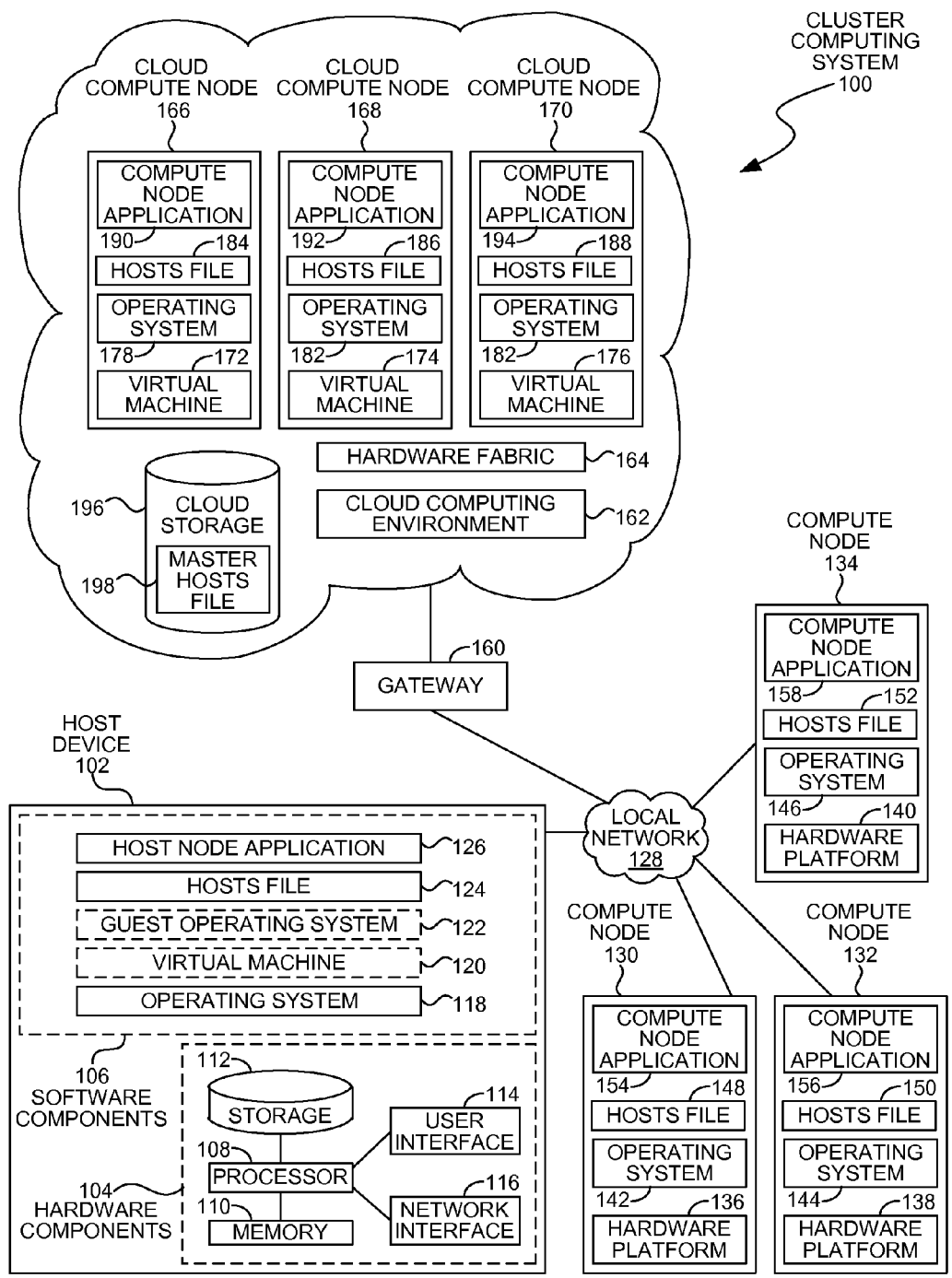
FIG. 1 is a diagram of an embodiment showing a first cluster computing system.

A cluster computing system may operate inside, outside, or partially within a cloud computing environment and may maintain a local hosts file on each device in the cluster. The local hosts file may contain the Internet Protocol (IP) addresses and a secondary friendly name for each of the nodes within the cluster.

The local hosts file may be used by each of the nodes in the cluster to identify the IP address of a specific node within the cluster. The local hosts file may be a table or other database that contains the IP addresses of devices in the cluster. The local hosts file may be queried when a device may attempt to communicate with another device in the cluster using the secondary friendly name.

The cluster may operate applications that call other nodes within the cluster. In order to make a call to another node in the cluster, each node may be addressed using a secondary friendly name that may be defined and managed by a host node. The secondary friendly name may allow the computing platforms and corresponding IP address to be changed for each compute node without having to restart the compute node.

In many cloud computing environments, a compute node may be implemented using a virtual machine. Typically, a virtual machine may have an IP address and a first friendly name. The first friendly name may be set for the compute node when the virtual machine or physical machine is started. In order to change the first friendly name, the virtual or physical machine may be restarted.

A cloud computing environment may periodically move an executing application from one virtual machine or physical machine to another. Such activities may be performed for load balancing, updating or upgrading hardware, servicing hardware, deploying software patches, or other administrative functions. During such functions, each virtual or physical machine may be identified using the first friendly name and addressed using a Domain Name System (DNS) or other technologies.

Because the cloud computing environment may move a compute node from one physical or virtual compute platform to another, the cluster application may refer to the hosts file for addressing other devices within the cluster.

The cluster may make use of two friendly names Each friendly name may be a human readable text name, which may be used as a proxy for an IP address, which may be a series of letters or numbers. The first friendly name may be the friendly name used by the Domain Name Service. In the case of a cloud computing environment, the first friendly name may be used by a cloud management system to address each of the various computing systems, such as virtual machines or physical hardware platforms.

The second friendly name may be used by the cluster to identify other devices within the cluster. The second friendly name may not be registered with a DNS server and may only be known through the use of a hosts file. When a device in the cluster attempts to access another device using the second friendly name, the device may look up the IP address from the hosts file and use that IP address to start a communication session.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a cluster computing system that may use some cloud compute nodes. Embodiment 100 is one example of an architecture that may use multiple compute nodes to execute parallel, high performance computing tasks.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is merely one example of a cluster computing system that has a host device 102 and multiple compute nodes 130, 132, 134, 166, 168, and 170. The various compute nodes may execute a distributed application where the various nodes may communicate with each other during execution. As part of the execution process, the nodes may send messages back and forth to each other.

The cluster may execute various distributed applications. Such applications may be in the high performance computing realm. Some applications may include computational fluid dynamics, finite element analysis, simulation, modeling, seismic tomography, or other engineering applications. Other applications may include data warehouses, line of business applications, transaction processing, and other business related applications Such applications may operate on many computing platforms. In a typical deployment, a set of compute nodes may be configured to operate in parallel and communicate with each other. The communications may be messages that are passed from one node to another at various stages of the application processing.

In order to facilitate the communications, a hosts file may be present on each of the nodes. The hosts file may be a table, database, or other storage mechanism that contains a secondary friendly name and the IP address of the corresponding node. In some embodiments, a particular operating system may have a specific manner in which a hosts file may be implemented. In some operating systems, a hosts file may be file located at a specific location in a directory with a specific name, such as a file "hosts" located in the directory /etc/ in the Unix operating system or % SystemRoot % \system32\drivers\etc\hosts in certain versions of Microsoft™ Windows™ operating system.

When a node attempts to contact another node, the node may look up an IP address for the other node in the hosts file by referring to the other node's secondary friendly name. After receiving the IP address from the hosts file, the node may send a message using the IP address.

The term "IP address" is used to denote a network address for a device. In many embodiments, the IP address may be an Internet Protocol address, such as Internet Protocol Version 4 or Internet Protocol Version 6. In other embodiments, the IP address may be another type of addressing scheme where the address refers to a specific device located on the network.

The various nodes may be implemented directly on a hardware platform or may be virtualized using a virtual machine or other virtualization technologies. When implemented directly on a hardware platform, a cluster application may execute within an operating system that executes on a hardware platform. In a virtual machine embodiment, the hardware platform may be virtualized so that a guest operating system may operate within a hypervisor or host operating system. Such embodiments are useful in cases where the executing application may be moved from one hardware platform to another.

In many operating systems, a network connection may be defined using an IP address and a friendly name. The first friendly name may be used by a Domain Name Service to identify the IP address of a device. The IP address and friendly name may be provided to a DNS server, which may be queried with the friendly name and may return the IP address. Such systems may perform a DNS query before each transmission so that the IP address of a recipient may be verified.

In some cloud computing environments, an active process, such as a compute node, may be moved from one hardware platform to another. Some such embodiments may move the active process to another virtual machine in some cases. When such transferring occurs, the IP address of a node may change.

The management system of a cloud computing environment may move a compute node from one machine to another for different conditions. For example, an executing process may be moved to another hardware platform for upgrades or service to the hardware platform or software on the hardware platform. In another example, an executing process may be moved so that computing loads within a data center may be consolidated or expanded.

When an IP address of a compute node may change, the change in IP address may be detected and the hosts file on the various compute nodes may be updated. In some embodiments, a cloud computing environment may transmit a notice to a host node or other controlling device. In other embodiments, a controlling device may perform periodic queries to determine if the IP address has changed for each device. Other embodiments may have other mechanisms to determine whether or not an IP address has changed.

The hosts file may be updated on the various compute nodes using many different techniques. In one technique, a master host file may be stored in a cloud storage system and queried periodically by each node. The query may compare a date stamp for a local copy on a node with the date stamp of the hosts file in the cloud storage system. When the date stamp of the master hosts file is newer than the local copy, the hosts file may be downloaded to the node.

In another technique, a host device may detect when an IP address has changed by periodically querying the various nodes. When a change has been detected, the master hosts file may be updated and the change propagated to the nodes.

The cluster may make use of two friendly names Each friendly name may be a human readable text name, which may be used as a proxy for an IP address, which may be a series of letters or numbers. The first friendly name may be the friendly name used by the Domain Name Service. In the case of a cloud computing environment, the first friendly name may be used by a cloud management system to address each of the various computing systems, such as virtual machines or physical hardware platforms.

The second friendly name may be used by the cluster to identify other devices within the cluster. The second friendly name may not be registered with a DNS server and may only be known through the use of a hosts file. When a device in the cluster attempts to access another device using the second friendly name, the device may look up the IP address from the hosts file and use that IP address to start a communication session.

In some embodiments, the second friendly name may be accessed quicker than a first friendly name, since the DNS query to a DNS server may be eliminated.

In many cases, a host device or other controlling device within a cluster may be responsible for creating the second friendly name.

Embodiment 100 is an example of an environment in which a cluster may operate. The host device 102 may be a controlling or management device that may manage the applications executing by the cluster. The host device 102 is illustrated as being contained in a single device 102. The host device 102 may have a hardware platform 104 and software components 106.

The host device 102 may represent a server or other computing device. In some embodiments, however, the device 102 may be any type of computing device, such as a personal computer, game console, cellular telephone, netbook computer, or other computing device.

The hardware components 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware components 104 may include a user interface 114, which may be any device through which a user may receive or input information. Examples may include monitors or other output devices, as well as keyboards and pointing devices as input devices.

The hardware components 104 may also include a network interface 116. The network interface 116 may include hardwired and wireless interfaces through which the device 102 may communicate with other devices.

The host device 102 may include an operating system 118 on which various applications may execute. In a virtualized embodiment, the host device 102 may have a virtual machine 120 that hosts a guest operating system 122. In such embodiments, a hypervisor may be used to expose hardware components to the guest operating system.

The host device 102 may have a host node application 126 that performs the functions of a host device for the cluster. In many embodiments, a host device may manage the various computers in the cluster and manage applications running on the cluster. The host device may be able to add or remove nodes to the cluster as well.

The host device 120 may manage a hosts file 124 that may be replicated on various nodes in the cluster. The host device 120 may update a master hosts file that may be propagated to the nodes.

Embodiment 100 illustrates a cluster that may have a single host device 102 that manages three local compute nodes 130, 132, and 134 as well as three cloud compute nodes 166, 168, and 170. Such an embodiment may illustrate a cluster that may take advantage of cloud computing resources. Any number of compute nodes may be used. In many cluster embodiments, the number of compute nodes may be 5, 10, 100, or 1000 or more nodes.

In some embodiments, a cluster may add more compute nodes when executing a big job or for some other reason. In some such cases, a host node 102 may identify additional computing resources and obtain those resources from a cloud computing environment on an on-demand basis. The cloud computing environment may serve as a backup or overflow resource that may be used when there are not enough local compute nodes to process the current workload.

Each local compute node 130, 132, and 134 may represent a local computer operating on a hardware platform 136, 138, and 140, respectively. An operating system 142, 144, and 146 may execute compute node applications 154, 156, and 158 and may also have local hosts files 148, 150, and 152, respectively.

In a cloud computing environment 162 accessed through a gateway 160, a hardware fabric 164 may execute the various cloud compute nodes 166, 168, and 170. The hardware fabric 164 may be made up of many hardware platforms containing processors, memory, and storage and may be arranged in a dynamic fashion so that a management system may be able to move the compute nodes from one hardware platform to another. In many cases, a hardware fabric 164 may abstract the hardware from the various software components.

The cloud compute nodes 166, 168, and 170 may execute on a virtual machine 172, 174, and 176. Each virtual machine may have a first friendly name that may be assigned by a cloud management system.

The cloud compute nodes 166, 168, and 170 may also have an operating system 178, 180, and 182 on which may execute compute node applications 190, 192, and 194, respectively. Each cloud compute node may have a hosts file 184, 186, and 188, respectively.

In many embodiments, a cloud storage 196 may contain a master hosts file 198 that may be maintained by the host device 102.

Figure 2:
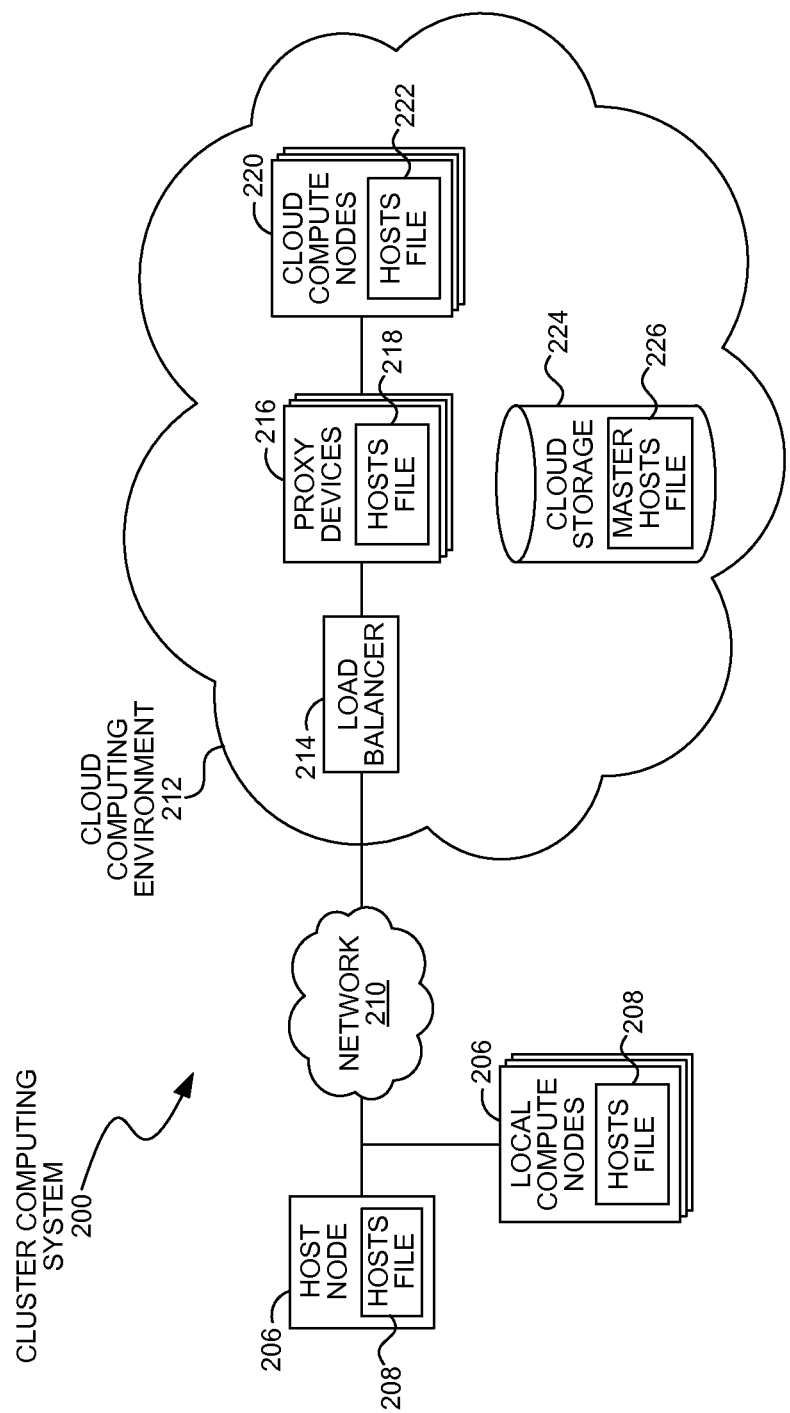
FIG. 2 is a diagram of an embodiment showing a second cluster computing system.

FIG. 2 is a diagram of an embodiment 200, showing a cluster computing system that may use some cloud compute nodes. Embodiment 200 is a second example of an architecture that may use multiple compute nodes to execute parallel, high performance computing tasks.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 illustrates a second embodiment of a cluster computing system that may use local compute nodes and cloud compute nodes. Embodiment 200 illustrates the use of proxy devices that may manage job requests coming to the cloud compute nodes.

In the illustration of embodiment 200, each device is illustrated functionally. Each device may operate with a processor and other hardware components, but such components are omitted for clarity.

A host node 202 may manage the entire cluster. The host node may be located in the same local network as various local compute nodes 206. A network 210 may connect the local devices to a cloud computing environment 212.

Within the cloud computing environment 212, a load balancer 214 may balance incoming traffic to two or more proxy devices 216. The proxy devices 216 may manage the workloads of various cloud compute nodes 220.

Embodiment 200 may have a cloud storage 224 on which a master hosts file 226 may be stored.

During operation of the cluster, the host node 202 may determine second friendly names for each of the various nodes in the cluster. The second friendly names may be the names used by the nodes to communicate within the cluster.

The second friendly names along with the IP addresses of each node may be stored in the master hosts file 226. The host node 202 may then cause the master host file to be distributed to the host node as the hosts file 204, the local compute nodes 206 as the hosts file 208, the proxy devices 216 as the hosts file 218, and the cloud compute nodes 220 as the hosts file 222.

In some embodiments, the proxy devices 216 may propagate the master hosts file 226 to the various cloud compute nodes 220. In many deployments, there may be many more cloud compute nodes 220 than proxy devices 216. For example, a cluster with 100 cloud compute nodes 220 may be serviced by two proxy devices 216.

In such embodiments, a change to the master hosts file 226 may be performed by the host node 202. The proxy devices 216 may either be notified of the change by the host node 202 or may query the cloud storage 224 to determine if the master hosts file 226 has been updated. In the event the master hosts file 226 has been updated, the proxy devices 216 may upload the new hosts file and propagate the new hosts file to the various cloud compute nodes 220.

Such an embodiment may be useful to minimize queries to the cloud storage 224.

Embodiment 200 may have several proxy devices 216, any of which may be able to respond to requests from the compute nodes 220 for updates to the hosts file.

In some embodiments, a compute node 220 may identify its current version of a hosts file by a hash, date stamp, or other identifier. Such identifier may be compared to an identifier for the hosts file on a proxy device 216 to determine whether or not the proxy device contains a more up-to-date hosts file.

Some embodiments may be able to detect a condition where a compute node 220 may have a more up-to-date hosts file than the proxy device 216. In such a condition, a host node or other service may be alerted and the proxy device 216 may update the hosts file.

In some embodiments, an update to a hosts file may be performed by transmitting a changed or amended portion of the hosts file, rather than transmitting the entire hosts file for each update.

In some embodiments, a web service or other application may perform the tasks regarding comparing and updating the hosts file for the various compute nodes 220. Such a service may operate within the cloud computing environment and may be separate from the proxy devices 216.

Figure 3:
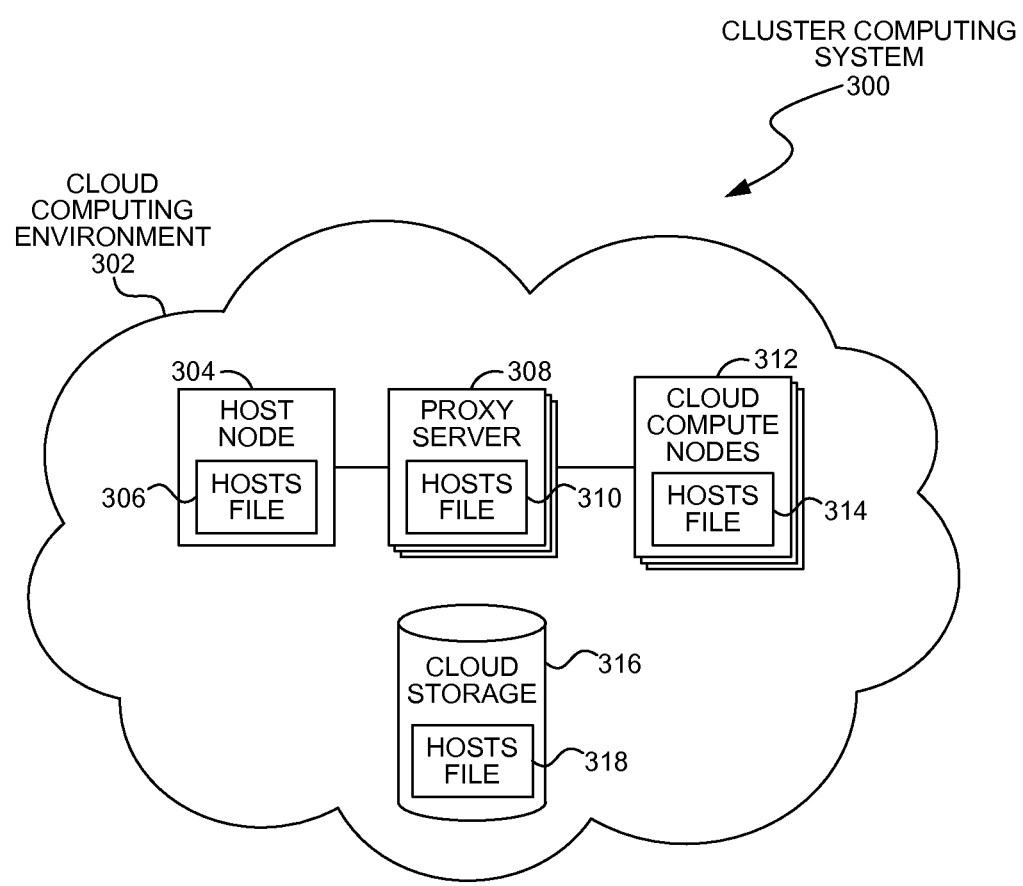
FIG. 3 is a diagram of an embodiment showing a third cluster computing system.

FIG. 3 is a diagram of an embodiment 300, showing a cluster computing system that may be implemented entirely in a cloud computing environment. Embodiment 300 is a third example of an architecture that may use multiple cloud compute nodes to execute parallel, high performance computing tasks.

The diagram of FIG. 3 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 300 illustrates a third embodiment of a cluster computing system that may be completely implemented using cloud compute nodes. Embodiment 300 illustrates the use of a host node that resides within the cloud computing environment.

In the illustration of embodiment 300, each device is illustrated functionally. Each device may operate with a processor and other hardware components, but such components are omitted for clarity.

Embodiment 300 illustrates an embodiment where the host node 304 resides in a cloud computing environment 302. The cloud computing environment 302 may be a managed computing resource where a hardware fabric is used to provide computing resources. The computing resources may be configured and managed in different manners, with each node being a separate set of computing resources.

Embodiment 300 illustrates a host node 304 that may operate with several proxy servers 308 to manage multiple cloud compute nodes 312. All of the various nodes may be cloud nodes.

A cloud storage 316 may contain a master hosts file 318 that may be propagated to the host node 304 as hosts file 306, the proxy servers 308 as hosts file 310, and the compute nodes 312 as the hosts file 314.

Figure 4:
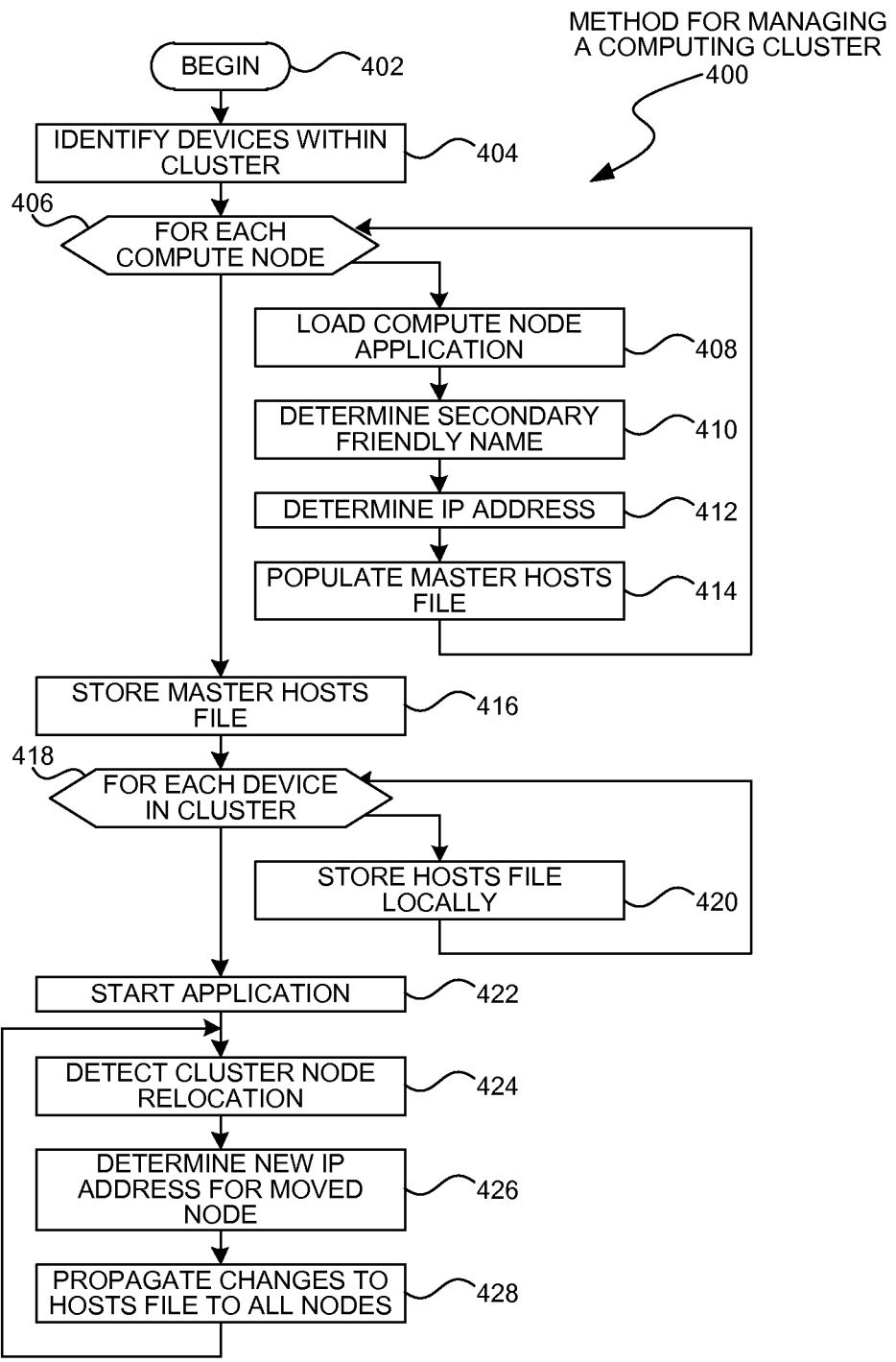
FIG. 4 is a flowchart of an embodiment showing a method for managing a cluster computing system.

FIG. 4 is a flowchart illustration of an embodiment 400 showing a method for managing a computing cluster. Embodiment 400 is a simplified example of a method that may be performed by a host node to configure and operate various compute nodes.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a simplified example of the operations a host node may perform in order to start a group of compute nodes and to update hosts files on each of the compute nodes.

The process may begin in block 402.

In block 404, all of the devices that are in the cluster may be identified. In some embodiments, some of the devices may be cloud computing resources.

Each of the devices may be analyzed in block 406. For each device in block 406, the compute node application may be loaded in block 408. A secondary friendly name may be defined in block 410 as well as the IP address in block 412. The master hosts file may be populated with the secondary friendly name and the IP address in block 414.

In many embodiments, the secondary friendly name may be assigned by a host node when the compute nodes are configured. The secondary friendly name may be the name used by all of the devices within the cluster to address each other.

After configuring all of the compute nodes in block 406, the master hosts file may be stored in block 416.

For each device in the cluster in block 418, a copy of the hosts file may be stored locally in block 420. In many embodiments, the hosts file may contain the IP addresses and secondary names of every device within the cluster.

In block 422, the application may be started on the compute nodes. At this point in the process, the application may be executing and the cluster may be operating normally.

During normal operations, a cluster node relocation may be detected in block 424. The node relocation may be detected by communicating with a cloud management system, querying the nodes, having the nodes notify the host node of a change, or some other mechanism.

The new IP address of a moved node may be determined in block 426 and the changes may be propagated to the other nodes in block 428.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A cluster computer system comprising:
   a plurality of computing systems, each of said computing systems having an Internet Protocol address, said Internet protocol address mapped to a first friendly name, said first friendly name set for each of said plurality of computing systems when said computing system was started, each of said computing systems utilizing a computer processor;
   a plurality of compute nodes running on said plurality of computing systems, said plurality of compute nodes operating in parallel and communicating with one another to execute a distributed application, at least a portion of said plurality of compute nodes hosted as cloud compute nodes;
   a host node that manages said distributed application, management of said distributed application, including:
      for each compute node:
         creating a second friendly name for said compute node;
         identifying an Internet Protocol address for said computing system wherein said compute node is running;
         mapping said second friendly name to said identified Internet Protocol address in a second mapping; and
         storing said second mapping in a hosts file;
      detecting changes in Internet Protocol addresses for compute nodes based on movements of compute nodes between said different computing systems;
      updating said hosts file by remapping said second mappings between said second friendly names and said changed Internet Protocol addresses; and
      managing distribution of said hosts file to said plurality of compute nodes to facilitate more efficient communication within the cluster computer system.

2. The cluster computer system of claim 1, said plurality of computing systems including at least one virtual machine.

3. The cluster computing system of claim 2 further comprising:
   a cloud storage in which said hosts file is stored.

4. The cluster computer system of claim 3, wherein managing distribution of said hosts file to said plurality of compute nodes comprises using a proxy node that retrieves said hosts file and propagates said hosts file to said plurality of compute nodes.

5. The cluster computer system of claim 2, said plurality of computing systems including at least one physical hardware platform.

6. The cluster computer system of claim 1, wherein detecting changes in Internet Protocol addresses for compute nodes comprises for each compute node:
   performing a query to said compute node to determine a current Internet Protocol address; and
   comparing said current Internet Protocol address to said second mapping for said compute node.

7. The cluster computer system of claim 1, all of said compute nodes hosted as cloud compute nodes.

8. The cluster computer system of claim 1, wherein detecting changes in Internet Protocol addresses for compute nodes based on movements of compute nodes between said different computing systems comprises detecting changes in Internet Protocol address caused by a load balancing operation for the distributed application.

9. The cluster computer system of claim 1, wherein managing distribution of said hosts file to said plurality of compute nodes comprises distributing amended portions said hosts file to said plurality of compute nodes.

10. At a host node, a method for managing a distributed application, the method comprising:
  starting a distributed application on a cluster computer system, said cluster computer system including plurality of computing systems, said distributed application including a plurality of compute nodes, said plurality of compute nodes distributed across said plurality of computing systems, each of said compute nodes operating executable code comprising said distributed application, each of said plurality of computing systems including a first friendly name and an Internet Protocol address, said friendly name set for each computing system when said computing system was started, said plurality of compute nodes operating in parallel and communicating with one another to execute said distributed application;
  for each compute node:
    creating a second friendly name for said compute node;
    identifying an Internet Protocol address for said computing system wherein said compute node is running;
    mapping said second friendly name to said identified Internet Protocol address in a second mapping; and
    storing said second mapping in a hosts file;
  detecting changes in Internet Protocol addresses for compute nodes based on movements of compute nodes between said different computing systems;
  updating said hosts file by remapping said second mappings between said second friendly names and said changed Internet Protocol addresses; and
  managing distribution of said hosts file to said plurality of compute nodes to facilitate more efficient communication within the cluster computer system.

11. The method of claim 10 wherein detecting changes in Internet Protocol addresses for compute nodes based on movements of compute nodes between said different computing systems comprises determining that a first compute node has been moved from a first computing system having a first Internet Protocol address to a second computing system having a second Internet Protocol address.

12. The method of claim 11 wherein updating said hosts file by remapping said second mappings between said second friendly names and said changed Internet Protocol addresses comprises updating said second mapping for said first compute node with said second Internet Protocol address.

13. The method of claim 12 wherein managing distribution of said hosts file to said plurality of compute nodes comprises propagating said hosts file by updating at least one proxy device with said hosts file.

14. The method of claim 11, wherein determining that said first compute node has been moved comprises querying said first compute node.

15. The method of claim 11, wherein determining that said first compute node has been moved comprises receiving a notice of movement.

16. The method of claim 10 further comprising:
  identifying an additional compute node to add to said plurality of compute nodes;
  starting said executable code on said additional compute node; and
  mapping an Internet Protocol address and a second friendly name for said third compute in second mapping; and
  storing said second mapping for said additional compute node in said hosts file.

17. The method of claim 10, wherein at least some of said compute nodes are hosted as cloud compute nodes.

18. A cluster computer system comprising:
  a plurality of computing systems, said plurality of computing systems including one or more virtual machines in a cloud computing environment and one or more physical hardware platforms, each of said computing systems having an Internet Protocol address, said Internet Protocol address mapped to a first friendly name, said first friendly name set for each of said plurality of computing systems when said computing system was started, each of said systems utilizing a computer processor;
  a plurality of compute nodes running on said plurality of computing systems, said plurality of compute nodes operating in parallel and communicating with one another to execute a distributed application, at least one compute nodes hosted on a virtual machine and at least one compute node hosted on a physical hardware platform;
  a host node that manages said distributed application, management of said distributed application, including:
    for each compute node:
      creating a second friendly name for said compute node;
      identifying an Internet Protocol address for said computing system wherein said compute node is running;
      mapping said second friendly name to said identified Internet Protocol address in a second mapping; and
      storing said second mapping in a hosts file;
    detecting changes in Internet Protocol addresses for compute nodes based on movements of compute nodes between said different computing systems;
    updating said hosts file by remapping said second mappings between said second friendly names and said changed Internet Protocol addresses; and
    managing distribution of said hosts file to said plurality of compute nodes to facilitate more efficient communication within the cluster computer system.

19. The cluster computer system of claim 18, wherein detecting changes in Internet Protocol address for compute nodes comprises for each compute node:
  performing a query to said computer node to determine a current Internet Protocol address; and
  comparing said current Internet Protocol address to said second mapping for said computer node.

20. The system of cluster computer claim 19, wherein managing distribution of said hosts file to said plurality of computer nodes comprises using a proxy that receives said hosts file and propagates said hosts file to said plurality of compute nodes.

* * * * *